US012158681B2

(12) United States Patent
Xiao et al.

(10) Patent No.: US 12,158,681 B2
(45) Date of Patent: Dec. 3, 2024

(54) DISPLAY MODULE AND DISPLAY DEVICE (71) Applicant: Wuhan China Star Optoelectronics Technology Co., Ltd., Hubei (CN)

(72) Inventors: Shiyuan Xiao, Hubei (CN); Suimang Song, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/623,609

(22) PCT Filed: Dec. 24, 2021

(86) PCT No.: PCT/CN2021/141235
§ 371 (c)(1),
(2) Date: Dec. 29, 2021

(87) PCT Pub. No.: WO2023/115546
PCT Pub. Date: Jun. 29, 2023

(65) Prior Publication Data
US 2024/0036425 A1 Feb. 1, 2024

(30) Foreign Application Priority Data
Dec. 22, 2021 (CN) .......................... 202111581099.5

(51) Int. Cl.
G02F 1/1368 (2006.01)
G02F 1/1345 (2006.01)
(52) U.S. Cl.
CPC ........ *G02F 1/1368* (2013.01); *G02F 1/13452* (2013.01)

(58) Field of Classification Search
CPC ............. H01L 27/0266; H01L 27/0288; H01L 27/0292; G02F 2202/22
See application file for complete search history.

(56) References Cited

U.S. PATENT DOCUMENTS

2009/0079894 A1    3/2009  Okuda
2010/0182524 A1*   7/2010  Nomura ............ G02F 1/133308
                                                    349/40

(Continued)

FOREIGN PATENT DOCUMENTS

CN    205193388    4/2016
CN    106526943    3/2017

(Continued)

OTHER PUBLICATIONS

Examination Report Under Sections 12 & 13 of the Patents Act, 1970 and the Patents Rules, 2003 Dated Nov. 14, 2022 From the Government of India, Intellectual Property India, Patents, Designs, Trademarks, Geographical Indications, The Patent Office Re. Application No. 202247024022. (5 Pages).

(Continued)

*Primary Examiner* — Jonathan Y Jung (57) ABSTRACT

The embodiment of the application provides a display module and a display device. The display module includes a metal back frame and a display panel. The display panel includes a first substrate disposed on the metal back frame and disposed opposite to the first substrate and between the first substrate and the metal back frame. The first substrate includes a substrate and a thin film transistor layer disposed on one side of the substrate close to the second substrate.

14 Claims, 5 Drawing Sheets

(56) References Cited

U.S. PATENT DOCUMENTS

| | | |
|---|---|---|
| 2012/0241774 A1 | 9/2012 | Chen et al. |
| 2012/0287368 A1 | 11/2012 | Que et al. |
| 2013/0343085 A1 | 12/2013 | Qian et al. |
| 2017/0146878 A1* | 5/2017 | Hirata ................ G02F 1/133345 |
| 2018/0032105 A1* | 2/2018 | Mathew ................ G06F 1/1658 |
| 2019/0094456 A1* | 3/2019 | Lee ........................ G02B 6/0088 |
| 2020/0363673 A1* | 11/2020 | Isobe .................. G02F 1/13458 |
| 2021/0124214 A1 | 4/2021 | Liu et al. |
| 2021/0191201 A1* | 6/2021 | Sun .......................... H10K 77/10 |

FOREIGN PATENT DOCUMENTS

| | | |
|---|---|---|
| CN | 105870127 | 6/2017 |
| CN | 206833100 | 1/2018 |
| CN | 108072992 | 5/2018 |
| CN | 108254961 | 7/2018 |
| CN | 109037468 | 12/2018 |
| CN | 110928061 | 3/2020 |
| CN | 111679504 | 9/2020 |
| CN | 214122615 | 9/2021 |
| JP | 2000-137446 | 5/2000 |
| JP | 2002-062858 | 2/2002 |
| JP | 2004-354606 | 12/2004 |
| JP | 2006-184349 | 7/2006 |
| JP | 2010-256656 | 11/2010 |
| TW | 201303424 | 1/2013 |

OTHER PUBLICATIONS

International Search Report and the Written Opinion Dated Sep. 16, 2022 From the International Searching Authority Re. Application No. PCT/CN2021/141235 and Its Translation Into English. (18 Pages).

Notification of Office Action and Search Report Dated May 18, 2023 From the State Intellectual Property Office of the People's Republic of China Re. Application No. 202111581099.5 and Its Translation Into English. (14 Pages).

Notification of Office Action and Search Report Dated Jan. 20, 2023 From the State Intellectual Property Office of the People's Republic of China Re. Application No. 202111581099.5 and Its Translation Into English. (14 Pages).

Notice of Reasons for Refusal Dated Jan. 23, 2023 From the Japan Patent Office Re. Application No. 2021-577677 and Its Translation Into English. (10 Pages).

* cited by examiner

DISPLAY MODULE AND DISPLAY DEVICE

RELATED APPLICATIONS

This application is a National Phase of PCT Patent Application No. PCT/CN2021/141235 having International filing date of Dec. 24, 2021, which claims the benefit of priority of Chinese Patent Application No. 202111581099.5 filed on Dec. 22, 2021. The contents of the above applications are all incorporated by reference as if fully set forth herein in their entirety.

FIELD AND BACKGROUND OF THE INVENTION

The present invention relates to a field of display technology, and in particular to a display module and a display device.

Figure 1:
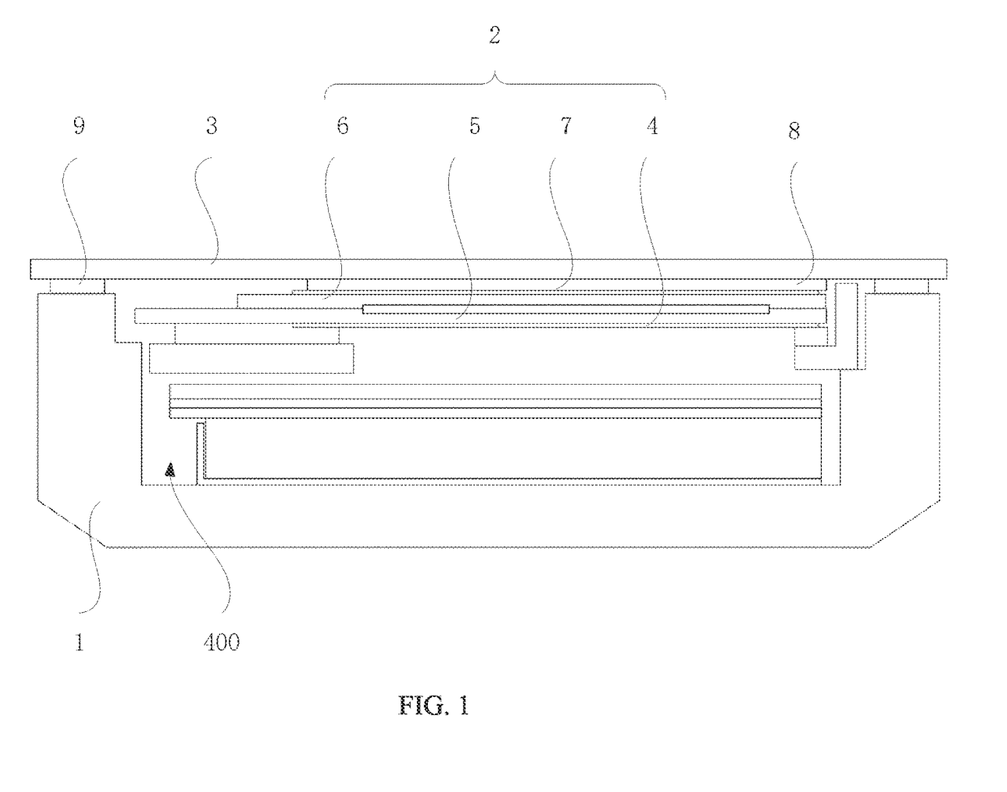
FIG. 1 is a schematic diagram of a vehicle display module in the prior art.

With the development of display technology and automotive technology, vehicle display modules have received widespread attention. At present, as shown in FIG. 1, vehicle display modules mainly include a frame body 1, a panel body 2 and a fixed cover 3, fixed cover 3 is connected to the frame body 1 through the fixing tape 9 to form a closed space 400, the panel main body 2 is integrally disposed in the closed space 400 and is connected to the fixed cover 3 by adhesive 8. The panel main body 2 includes a laminated first polarizing structure 4, an array substrate 5, a color filter substrate 6 and a laminated second polarizing structure 7. The panel body 2 is bonded to the fixed cover 3 on the side where the second polarizing structure 7 is provided. This structure using adhesive 8 to connect the fixed cover plate 3 and the panel body 2 is easy to lead to excessive thickness of the vehicle display module, which is not suitable for the development demand of thinning the vehicle display module.

SUMMARY OF THE INVENTION

The present invention provides display module and a display device to solve the technical problem of large thickness of vehicle display module.

The present invention provides a display module including a metal back frame and a display panel disposed on the metal back frame, wherein the display panel includes:
 a first substrate, wherein at least one end of the first substrate is disposed on the metal back frame; and
 a second substrate disposed opposite to the first substrate and located between the first substrate and the metal back frame, wherein a liquid crystal layer is disposed between the first substrate and the second substrate; and
 wherein the first substrate includes a base and a thin film transistor layer disposed on one side of the base close to the second substrate.

In some embodiment of the display module, the display panel further includes an opposing area and a connecting area surrounding the opposing area;
 the first substrate further includes a display driving part located in the opposing area and a first connecting part located in the connecting area; and
 the metal back frame includes a metal back cover disposed opposite to the first substrate and a metal support plate extending along a direction from the peripheral side of the metal back cover to the first substrate, and the metal support plate is located in the connecting area and connected to the first connecting part.

In some embodiment of the display module, the display module further includes a first conductive adhesive located in the connecting area and connecting the first substrate with the metal back frame; and
 the thin film transistor layer includes a first electrostatic discharge terminal located in the connecting area, and the first conductive adhesive is electrically connecting the metal support plate with the first electrostatic discharge terminal.

In some embodiment of the display module, the thin film transistor layer is provided with a first groove located in the connecting area, and the first electrostatic discharge terminal is disposed in the first groove; and
 one end of the first conductive adhesive is electrically connected to the metal support plate, and another end of the first conductive adhesive is disposed in the first groove and is electrically connected to the first electrostatic discharge terminal.

In some embodiment of the display module, the thin film transistor layer further includes a first metal layer disposed on the base, a second metal layer disposed on the first metal layer, and an insulating layer stacked with the first metal layer and the second metal layer, and the first groove is defined in the insulating layer and located in the connecting area; and
 the first metal layer includes the first electrostatic discharge terminal, or the second metal layer includes the first electrostatic discharge terminal.

In some embodiment of the display module, the second metal layer includes the first electrostatic discharge terminal, and the insulating layer includes a first insulating sublayer disposed on a side of the second metal layer away from the base; and
 the first groove corresponds to the first electrostatic discharge terminal and is defined indefined in the first insulating sublayer.

In some embodiment of the display module, the first metal layer includes the first electrostatic discharge terminal, and the insulating layer includes a first insulating sublayer disposed on one side of the second metal layer away from the base, and a second insulating sublayer disposed between the first metal layer and the second metal layer; and
 the first groove corresponds to the first electrostatic discharge terminal and is defined in the first insulating sublayer and the second insulating sublayer.

In some embodiment of the display module, the metal supporting plate is provided with a second groove located in the connecting area; and
 one end of the first conductive adhesive is disposed in the second groove and is electrically connected to the metal supporting plate, and another end of the first conductive adhesive is disposed in the first groove and is electrically connected to the first electrostatic discharge terminal.

In some embodiment of the display module, the second groove is annularly defined in the metal supporting plate and disposed around the opposing area.

In some embodiment of the display module, an orthograph projection of the first conductive adhesive on the base overlaps an orthograph projection of the first electrostatic discharge terminal on the base.

In some embodiment of the display module, the first connecting part is disposed around the display driving part and connected to the metal supporting plate, and the second substrate is disposed opposite to the display driving part and is located in the opposing area.

In some embodiment of the display module, the connecting area includes a first connecting subarea and a second connecting subarea, the metal support plate includes a first support plate located in the first connecting subarea and a second support plate located in the second connecting subarea, and a distance from the second support plate to the first substrate is greater than a distance from the first support plate to the first substrate; and the second substrate includes a second connecting part located in the second connecting subarea, the first support plate and the first connecting part are connected in the first connecting subarea, and the second support part and the second connecting part are connected in the second connecting subarea.

In some embodiment of the display module, the display module further includes a first conductive adhesive located in the first connecting subarea and connecting the first connecting part with the first support plate, and a second conductive adhesive located in the second connecting subarea and connecting the second connecting part with the second supporting plate; and the first substrate further includes a first electrostatic discharge terminal located in the first connecting subarea, the second substrate further includes a second electrostatic discharge terminal located in the second connecting subarea, the first conductive adhesive is electrically connected the first support plate with the first electrostatic discharge terminal, and the second conductive adhesive is electrically connected the second support plate with the second electrostatic discharge terminal.

The present invention further provides a display device including a display module and a device main body, wherein the display module and the device main body are combined into one body;

wherein the display module includes a metal back frame and a display panel disposed on the metal back frame, and the display panel includes:

a first substrate, at least one end of the first substrate is disposed on the metal back frame; and a second substrate disposed opposite to the first substrate and is located between the first substrate and the metal back frame, a liquid crystal layer is disposed between the first substrate and the second substrate; and wherein the first substrate includes a base and a thin film transistor layer disposed on one side of the base close to the second substrate.

In some embodiment of the display device, the display panel further includes an opposing area and a connecting area surrounding the opposing area;

the first substrate further includes a display driving part located in the opposing area and a first connecting part located in the connecting area; and the metal back frame includes a metal back cover disposed opposite to the first substrate and a metal support plate extending along a direction from the peripheral side of the metal back cover to the first substrate, and the metal support plate is located in the connecting area and connected to the first connecting part.

In some embodiment of the display device, the display module further includes a first conductive adhesive located in the connecting area and connecting the first substrate with the metal back frame; and the thin film transistor layer includes a first electrostatic discharge terminal located in the connecting area, and the first conductive adhesive is electrically connected the metal support plate with the first electrostatic discharge terminal.

In some embodiment of the display device, wherein the thin film transistor layer is provided with a first groove located in the connecting area, and the first electrostatic discharge terminal is disposed in the first groove; and one end of the first conductive adhesive is electrically connected to the metal support plate, and another end of the first conductive adhesive is disposed in the first groove and is electrically connected to the first electrostatic discharge terminal.

In some embodiment of the display device, the thin film transistor layer further includes a first metal layer disposed on the base, a second metal layer disposed on the first metal layer, and an insulating layer stacked with the first metal layer and the second metal layer, and the first groove is defined in the insulating layer and located in the connecting area; and the first metal layer includes the first electrostatic discharge terminal, or the second metal layer includes the first electrostatic discharge terminal.

In some embodiment of the display device, the connecting area includes a first connecting subarea and a second connecting subarea, the metal support plate includes a first support plate located in the first connecting subarea and a second support plate located in the second connecting subarea, and a distance from the second support plate to the first substrate is greater than a distance from the first support plate to the first substrate; and the second substrate includes a second connecting part located in the second connecting subarea, the first support plate and the first connecting part are connected in the first connecting subarea, and the second support plate and the second connecting part are connected in the second connecting subarea.

In some embodiment of the display device, the display module further includes a first conductive adhesive located in the first connecting subarea and connecting the first connecting part with the first support plate, and a second conductive adhesive located in the second connecting subarea and connecting the second connecting part with the second supporting plate; and the first substrate further includes a first electrostatic discharge terminal located in the first connecting subarea, the second substrate further includes a second electrostatic discharge terminal located in the second connecting subarea, the first conductive adhesive is electrically connected the first support plate with the first electrostatic discharge terminal, and the second conductive adhesive is electrically connected the second support plate with the second electrostatic discharge terminal.

The beneficial effect of the application: by disposing the first substrate of the display panel on the metal back frame, and disposing the second substrate of the display panel opposite to the first substrate and located between the first substrate and the metal back frame, the complexity of the overall structure of the display module is reduced. Obviously, this structure that the first substrate of the display panel directly disposes on the metal back frame omits the adhesive, the fixed cover plate, and other original related films, and the thickness of the display module is reduced to meet the thinning requirements of the display module.

BRIEF DESCRIPTION OF THE SEVERAL VIEWS OF THE DRAWINGS

In order to explain the embodiments or the technical solutions in the prior art more clearly, the following will briefly introduce the drawings that need to be used in the description of the embodiments or the prior art. The drawings in the following description are only for disclosure, for those of ordinary skill in the art, without creative work, other drawings can be obtained from these drawings.

DESCRIPTION OF SPECIFIC EMBODIMENTS OF THE INVENTION

The following description of the embodiments is made with reference to additional illustrations to illustrate specific embodiments that the present invention can be implemented. The direction terms mentioned in the invention, such as [up], [down], [front], [back], [left], [right], [inside], [outside], [side], etc., are only the direction of reference to the additional schematic. Therefore, the directional terms used are intended to illustrate and understand the invention, not to limit the invention. In the figure, units with similar structures are represented by the same label.

In the description of the present application, it should be understood that the terms "first" and "second" are only used for descriptive purposes, and cannot be understood as indicating or implying relative importance or implicitly indicating the number of indicated technical features. Thus, the features defining "first" and "second" may explicitly or implicitly include one or more of the features. In the description of this application, "multiple" means two or more, unless otherwise expressly and specifically defined In the description of the present application, it should be understood that the terms "first" and "second" are only used for descriptive purposes and cannot be understood as indicating or implying relative importance or implicitly indicating the number of indicated technical features. Thus, the features defining "first" and "second" may explicitly or implicitly include one or more of the features. In the description of this application, "multiple" means two or more, unless otherwise expressly and specifically defined.

In the description of the application, it should be noted that, unless otherwise clearly specified and limited, the terms "installation", "connection" and "connection" should be understood in a broad sense, for example, it can be fixed connection, removable connection, or integrated connection; it can be mechanical connection, electrical connection or mutual communication; it can be directly connected or indirectly connected through an intermediate medium, it can be the connection within two elements or the interaction relationship between two elements. For those skilled in the art, the specific meaning of the above terms in the application can be understood according to the specific circumstances.

The technical scheme of the application is described in combination with specific embodiments.

Figure 2:
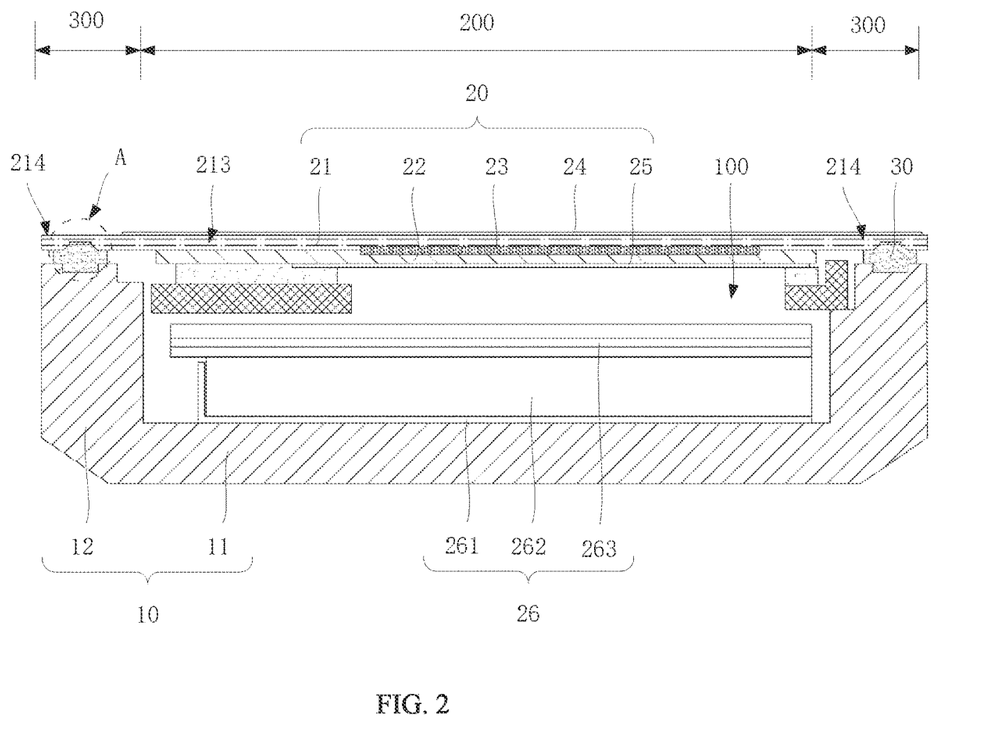
FIG. 2 is a first schematic diagram of the display module provided by the embodiment of the application.
Figure 3:
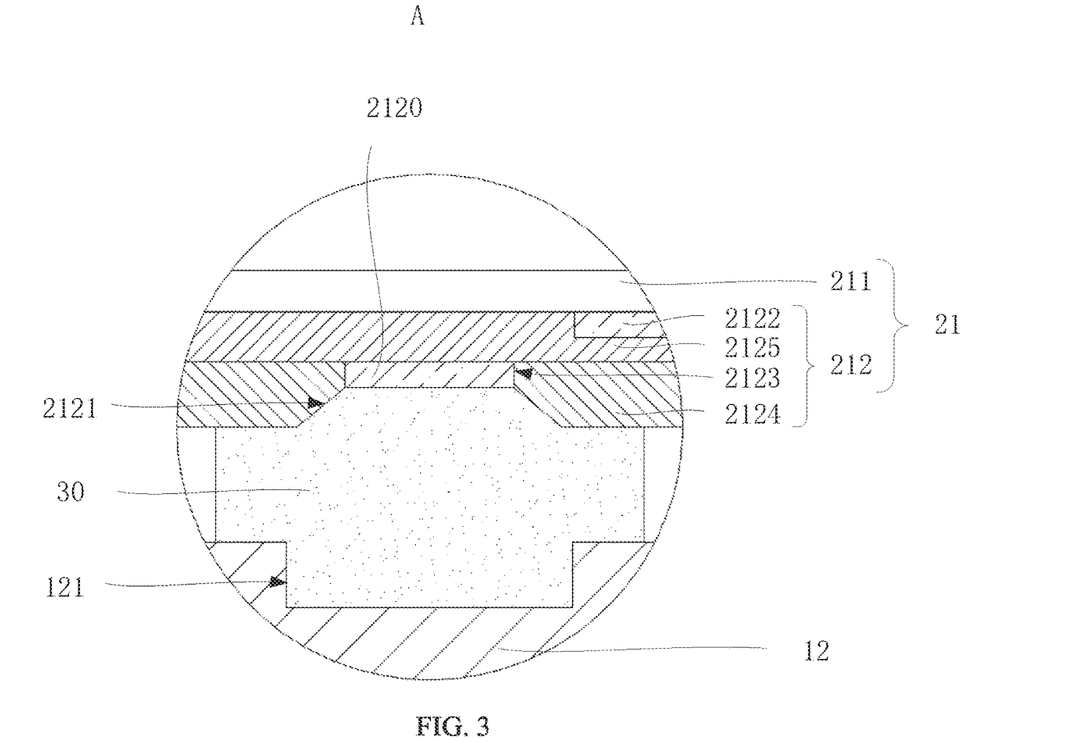
FIG. 3 is a schematic diagram of the first partial enlarged structure at A in FIG. 2.
Figure 4:
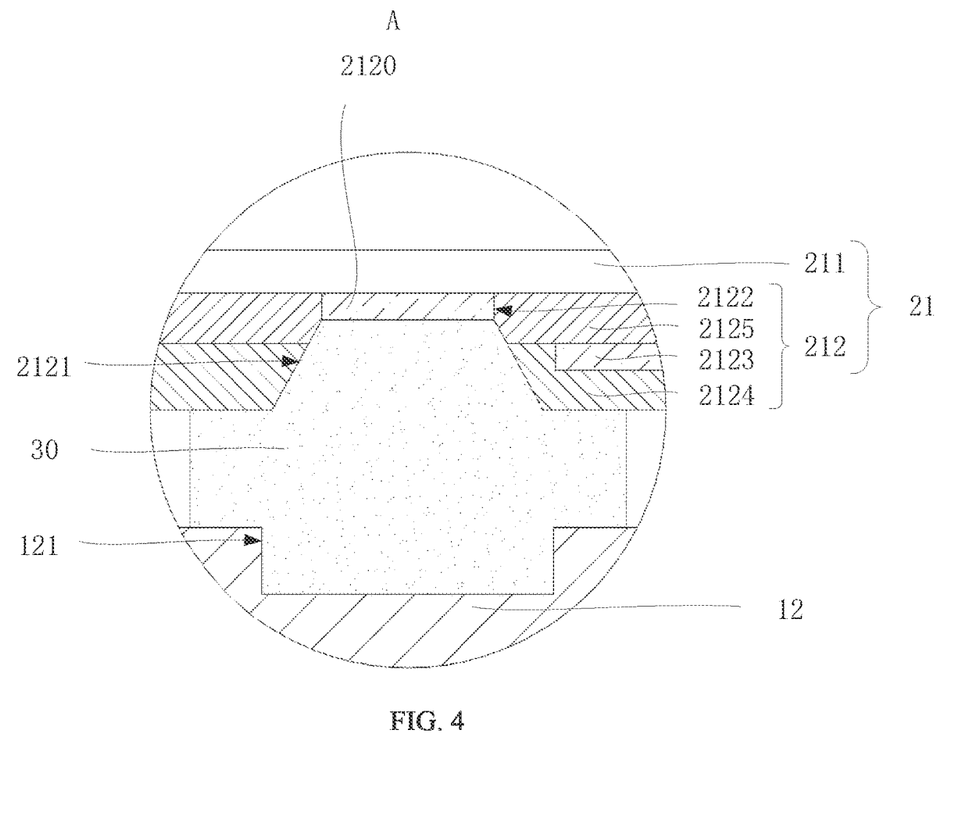
FIG. 4 is a schematic diagram of the second partial enlarged structure at A in FIG. 2.

Please refer to FIG. 2 to FIG. 4, The embodiment of the present application provides a display module including a metal back frame 10 and a display panel 20 disposed on the metal back frame 10, wherein the display panel includes:

a first substrate 21, wherein at least one end of the first substrate 21 is disposed on the metal back frame 10; and a second substrate 22 disposed opposite to the first substrate 21 and is located between the first substrate 21 and the metal back frame 10, wherein a liquid crystal layer 23 is disposed between the first substrate 21 and the second substrate 22; and wherein, the first substrate 21 includes a base and a thin film transistor layer disposed on one side of the base close to the second substrate.

It can be understood that, at present, as shown in FIG. 1, vehicle display modules mainly include a frame body 1, a panel body 2 and a fixed cover 3, fixed cover 3 is connected to the frame body 1 through the fixing tape 9 to form a closed space 400, the panel main body 2 is integrally disposed in the closed space 400 and is connected to the fixed cover 3 by adhesive 8. The panel main body 2 includes a laminated first polarizing structure 4, an array substrate 5, a color filter substrate 6 and a laminated second polarizing structure 7. The panel body 2 is bonded to the fixed cover 3 on the side where the second polarizing structure 7 is provided. This structure using adhesive 8 to connect the fixed cover plate 3 and the panel body 2 is easy to lead to excessive thickness of the vehicle display module, which is not suitable for the development demand of thinning the vehicle display module; In this embodiment, by disposing the first substrate 21 of the display panel 20 on the metal back frame 10, and disposing the second substrate 22 of the display panel 20 opposite the first substrate 21 and located between the first substrate 21 and the metal back frame 10, the complexity of the overall structure of the display module is reduced. Obviously, this structure of that the first substrate 21 of the display panel directly disposes on the metal back frame 10 omits the adhesive 8, the fixed cover plate 3 and other related original films, and the thickness of the display module is reduced, to meet the thinning requirements of the display module.

It is worth noting that, as shown in FIG. 1, at present, the vehicle display module is assembled through the connection between the fixed cover plate 3 and the frame 1 and the connection between the fixed cover plate 3 and the panel body 2 respectively. Specifically, the structure in which the fixed cover plate 3 and the panel body 2 are bonded and fixed by adhesive 8 is also easy to increase the difficulty of the vehicle display module process. In this embodiment, By directly setting the first substrate 21 of the display panel 20 on the metal back frame 10, the original functional films such as fixed cover plate 3 and adhesive 8 are eliminated, that is, the manufacturing difficulty of the display module is reduced and the yield of the display module is improved; in addition, in this embodiment, the first substrate 21 includes a base 211 and a thin film transistor layer 212 disposed on the side of the base 211 close to the second substrate 22. The base 211 is a hard substrate to protect other functional films in the display module., specifically, the base 211 can be a glass substrate.

It should be noted that, the display panel 20 further includes a first polarizer 24 and a second polarizer 25. The first polarizer 24 is disposed on the side of the first substrate 21 away from the second substrate 22, and the second polarizer 25 is disposed on the side of the second substrate 22 away from the first substrate 21. The display module further includes a backlight module 26 disposed between the display panel 20 and the metal back frame 10 and located in a holding space 100, the backlight module 26 at least includes a stacked reflector 261, a light guide plate 262 and an optical film 263. Specifically, the backlight module 26 is a side entry structure or a straight down structure, which is not limited here.

In one embodiment, please refer to FIG. 2, wherein the display panel further includes an opposing area 200 and a connecting area 300 surrounding the opposing area 200;
the first substrate 21 further includes a display driving part 213 located in the opposing area 200 and a first connecting part 214 located in the connecting area 300; and
the metal back frame 10 includes a metal back cover 11 disposed opposite to the first substrate 21 and a metal support plate 12 extending along a direction from the peripheral side of the metal back cover to the first substrate 21, and the metal support plate 12 is located in the connecting area 300 and connected to the first connecting part 214.

It can be understood that the display panel 20 includes an opposing area 200 and a connecting area 300 surrounding the opposing area 200, and divides the first substrate 21 into a display driving unit 213 located in the opposing area 200 and a first connection part 214 located in the connecting area 300, and the metal back frame 10 is divided into a metal back cover 11 disposed opposite to the first substrate 21 and a metal support plate 12 extending from the peripheral side of the metal back cover 11 to the direction of the first substrate 21. The metal support plate 12 is located in the connecting area 300 and connected to the first connection part 214, to realize the connection between the first substrate 21 and the metal back frame 10 in the connecting area 300.

It should be noted that the first connecting part 214 can be disposed around the display driving part 213 and connected to the metal support plate 12, the second substrate 22 can be disposed opposite to the display driving part 213 and located in the opposing area 200, and the first substrate 21, the metal back cover 11 and the metal support plate 12 can be enclosed to form a holding space 100. In this embodiment, the second substrate 22 can be located in the holding space, the second substrate 22 can be disposed opposite to the display driving unit 213 and located in the opposing area 200, that is, the second substrate 22 is aligned with the display driving unit 213, and the liquid crystal layer 23 is disposed between the second substrate 22 and the display driving part 213, to realize the function of driving the liquid crystal deflection in the liquid crystal layer 23.

In one embodiment, please refer to FIG. 2 to FIG. 4, the display module further includes a first conductive adhesive 30 located in the connecting area 300 and connecting the first substrate 21 with the metal back frame 10; and
the thin film transistor layer 212 includes a first electrostatic discharge terminal 2120 located in the connecting area 300, and the first conductive adhesive 30 is electrically connecting the metal support plate 12 with the first electrostatic discharge terminal 2120.

It can be understood that, as shown in FIG. 1, at present, the vehicle display module is assembled through the connection of the fixed cover plate 3 with the frame 1 and the panel body 2 respectively, wherein the fixed cover plate 3 is connected to the panel body 2 through the adhesive 8, and the fixed cover plate 3 is connected to the frame 1 through the fixed adhesive 9, so that the static electricity generated on the panel body 2 cannot be released to the frame 1, the electrostatic discharge capacity of the vehicle display module is low, which affects the use experience. In this embodiment, the display module includes a first conductive adhesive located in the connecting area 300 and connecting the first substrate 21 with the metal back frame 10, and the thin film transistor layer 212 includes a first electrostatic discharge terminal 2120 located in the connecting area 300, which electrically connected the metal support plate 12 to the first electrostatic discharge terminal 2120 through the first conductive adhesive 30. Thus, it is convenient to release the static electricity on the thin film transistor layer 212 to the metal back frame 10, and the static electricity release ability of the display module is improved; specifically, the first conductive adhesive 30 may be a conductive foam tape or an optical adhesive embedded with conductive gold balls.

In one embodiment, please refer to FIG. 2 to FIG. 4, thin film transistor layer 212 is provided with a first groove 2121 located in the connecting area 300, and the first electrostatic discharge terminal 2120 is disposed in the first groove 21221; and
one end of the first conductive adhesive 30 is electrically connected to the metal support plate 12, and another end of the first conductive adhesive 30 is disposed in the first groove 2121 and is electrically connected to the first electrostatic discharge terminal 2120.

It can be understood that the thin film transistor layer 212 includes a first groove 2121 located in the connecting area 300, and the first electrostatic discharge terminal 2120 is disposed in the first groove 2121, and one end of the first conductive adhesive 30 is electrically connected to the metal support plate 12, another end of the first conductive adhesive 30 is disposed in the first groove 2121 and electrically connected to the first electrostatic discharge terminal 2120. By setting the first groove 2121, one end of the first conductive adhesive 30 is disposed in the first groove 2121 and electrically connected to the first electrostatic discharge terminal 2120, the first conductive adhesive 30 is prevented from being squeezed between the first panel and the metal back frame 10, which further reduces the thickness of the display module, and also ensures the full contact between the first conductive adhesive 30 and the first electrostatic discharge terminal 2120.

In one embodiment, please refer to FIG. 3 to FIG. 4, wherein the thin film transistor layer 212 further includes a first metal layer 2122 disposed on the base 211, a second metal layer 2123 disposed on the first metal layer 2122, and an insulating layer stacked with the first metal layer 2122 and the second metal layer 2123, and the first groove 2121 is defined in the insulating layer and located in the connecting area 300; and
the first metal layer 2122 includes the first electrostatic discharge terminal 2120, or the second metal layer 2123 includes the first electrostatic discharge terminal 2120.

It can be understood that the thin film transistor layer 212 includes a first metal layer 2122 disposed on the base 211, a second metal layer 2123 disposed on the first metal layer 2122, and an insulating layer stacked with the first metal layer 2122 and the second metal layer 2123, the first groove 2121 is disposed on the insulating layer and located in the connecting area 300. The first metal layer 2122 includes the first electrostatic discharge terminal 2120, or the second metal layer 2123 includes the first electrostatic discharge terminal 2120, that is, the first metal layer 2122 and the first electrostatic discharge terminal 2120 are disposed on the same layer, or the second metal layer 2123 and the first electrostatic discharge terminal 2120 are disposed on the same layer. Thus, the static electricity on the thin film transistor layer 212 can be released to the metal back frame 10 without adding a new film layer structure. In this embodiment, the first metal layer 2122 can further include a gate located in the opposing area 200, and the second metal layer 2123 can further include a source and a drain located in the opposing area 200.

In one embodiment, please refer to FIG. 3, the second metal layer 2123 includes the first electrostatic discharge terminal 2120, and the insulating layer includes a first insulating sublayer 2124 disposed on a side of the second metal layer 2123 away from the base 211; and the first groove 2121 corresponds to the first electrostatic discharge terminal 2120 and is defined in the first insulating sublayer 2124.

It can be understood that the second metal layer 2123 includes the first electrostatic discharge terminal 2120, that is, the second metal layer 2123 and the first electrostatic discharge terminal 2120 are disposed on the same layer, and the insulating layer includes the first insulator layer 2124 disposed on the side of the second metal layer 2123 away from the base 211. The first groove 2121 corresponds to the first electrostatic discharge terminal 2120 and is defined in the first insulator layer 2124, so that the first conductive adhesive 30 can be electrically connected to the first electrostatic discharge terminal 2120 through the first groove 2121.

In one embodiment, please refer to FIG. 4, the first metal layer 2122 includes the first electrostatic discharge terminal 2120, and the insulating layer includes a first insulating sublayer 2124 disposed on one side of the second metal layer 2123 away from the base 211, and a second insulating sublayer 2125 disposed between the first metal layer 2122 and the second metal layer 2123; and the first groove 2121 corresponds to the first electrostatic discharge terminal 2120 and is defined in the first insulating sublayer 2124 and the second insulating sublayer 2125.

It can be understood that the first metal layer 2122 includes the first electrostatic discharge terminal 2120, that is, the first metal layer 2122 and the first electrostatic discharge terminal 2120 are disposed on the same layer, and the insulating layer includes the first insulator layer 2124 disposed on the side of the second metal layer 2123 away from the base 211. A second insulator layer 2125 disposed between the first metal layer 2122 and the second metal layer 2123, the first groove 2121 corresponds to the first electrostatic discharge terminal 2120 and is defined in the first insulator layer 2124 and the second insulator layer 2125 so that the first groove 2121 passes through the first insulator layer 2124 and the second insulator layer 2125. The depth of the first groove 2121 is maximized, so that the volume containing the first conductive adhesive 30 is increased, compared with the structure disposed on the same layer of the second metal layer 2123 and the first electrostatic discharge terminal 2120, the thickness of the display module is further reduced.

In one embodiment, please refer to FIG. 2 to FIG. 4, the metal supporting plate 12 is provided with a second groove 121 located in the connecting area 300; and one end of the first conductive adhesive 30 is disposed in the second groove 121 and is electrically connected to the metal supporting plate 12, and another end of the first conductive adhesive 30 is disposed in the first groove 2121 and is electrically connected to the first electrostatic discharge terminal 2120.

It can be understood that the metal support plate 12 is provided with a second groove 121 located in the connecting area 300, and the thin film transistor layer 212 is provided with a first groove 2121 located in the connecting area 300, so that one end of the first conductive adhesive 30 is disposed in the second groove 121 and electrically connected to the metal support plate 12, another end of the first conductive adhesive 30 is disposed in the first groove 2121 and electrically connected to the first electrostatic discharge terminal 2120, so that both ends of the first conductive adhesive 30 are disposed in the first groove 2121 and the second groove 121 as much as possible, reducing the thickness of the display module, the electrostatic discharge on the thin film transistor layer 212 to the metal back frame 10 is also realized.

In one embodiment, the second groove 121 is annularly defined in the metal supporting plate 12 and disposed around the opposing area 200. It can be understood that the second groove 121 is a ring and annularly disposed around the opposing area 200, and the first conductive adhesive 30 is at least disposed in the second groove 121, so as to facilitate the bonding of the first substrate 21 and the metal back frame 10 through the first conductive adhesive 30, and increase the area of electrical connection between the metal back frame 10 and the first conductive adhesive 30 at the same time, it is convenient to discharge static electricity on the thin film transistor layer 212 to the metal back frame 10.

In one embodiment, please refer to FIG. 2 to FIG. 4, an orthograph projection of the first conductive adhesive 30 on the base 211 overlaps an orthograph projection of the first electrostatic discharge terminal 2120 on the base 211.

It can be understood that the orthograph projection of the first conductive adhesive 30 on the base 211 overlaps the orthograph projection of the first electrostatic discharge terminal 2120 on the base 211, that is, the first conductive adhesive 30 is completely covered on the first electrostatic discharge terminal 2120, so that the first conductive adhesive 30 is fully electrically connected to the first electrostatic discharge terminal 2120, it is convenient to discharge static electricity on the thin film transistor layer 212 to the metal back frame 10. In one embodiment, please refer to FIG. 5, the connecting area 300 includes a first connecting subarea 310 and a second connecting subarea 320, the metal support plate 12 includes a first support plate 121 located in the first connecting subarea 310 and a second support plate 122 located in the second connecting subarea 320, and a distance from the second support plate 122 to the first substrate 21 is greater than a distance from the first support plate 121 to the first substrate 21; and the second substrate 22 includes a second connecting part 221 located in the second connecting subarea 320, the first support plate 121 and the first connecting part 214 are connected in the first connecting subarea 310, and the second support part 122 and the second connecting part 221 are connected in the second connecting subarea 320.

Figure 5:
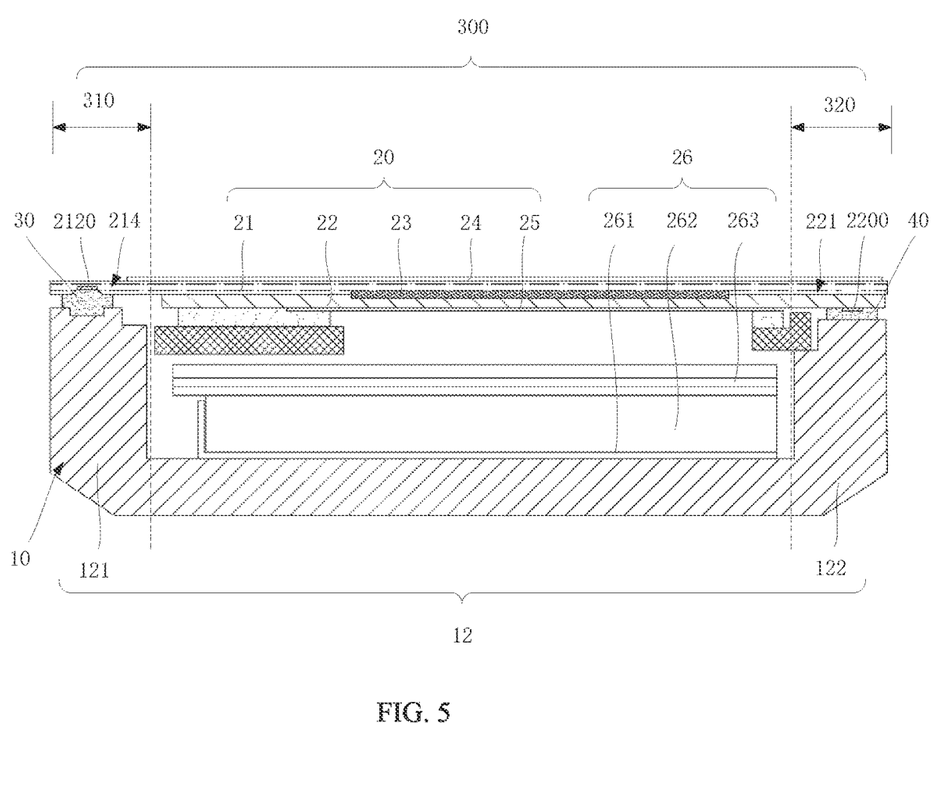
FIG. 5 is a second schematic diagram of the display module provided by the embodiment of the application.

It can be understood that the connecting area 300 includes a first connecting subarea 310 and a second connecting subarea 320, and the metal support plate 12 includes a first support plate 121 located in the first connecting subarea 310 and a second support plate 122 located in the second connecting subarea 320, and the spacing between the second support plate 122 and the first substrate 21 is set to be greater than the spacing between the first support plate 121 and the first substrate 21, so that the first substrate 21 extends into the second connecting subarea 320, so that the metal support plate 12 can be connected to the first substrate 21 in the first connecting subarea 310. And the metal support plate 12 is connected to the second substrate 22 in the second connecting subarea 320, specifically, the second substrate 22 includes a second connecting part 221 located in the second connecting subarea 320, and the first support plate 121 and the first connecting part 214 are connected in the first connecting subarea 310, the second support plate 122 and the second connecting part 221 are connected in the second connecting subarea 320, thereby reducing the thickness of the display module to meet the thinning requirements of the display module.

In one embodiment, please refer to FIG. 5, the display module further includes a first conductive adhesive 30 located in the first connecting subarea 310 and connecting the first connecting part 214 with the first support plate 121, and a second conductive adhesive 40 located in the second connecting subarea 320 and connecting the second connecting part 221 with the second supporting plate 122; and the first substrate 21 further includes a first electrostatic discharge terminal 2120 located in the first connecting subarea 310, the second substrate 22 further includes a second electrostatic discharge terminal 2200 located in the second connecting subarea 320, the first conductive adhesive 30 is electrically connected the first support plate 121 with the first electrostatic discharge terminal 2120, and the second conductive adhesive 40 is electrically connected the second support plate 122 with the second electrostatic discharge terminal 2200.

It can be understood that, as shown in FIG. 1, at present, the vehicle display module is assembled with the frame 1 and the panel body 2 respectively through the connection of the fixed cover plate 3, wherein the fixed cover plate 3 is connected with the panel body 2 through the adhesive 8. And the fixed cover plate 3 is connected with the frame 1 through the fixed adhesive 9, so that the static electricity generated on the panel body 2 cannot be released to the frame 1. The electrostatic discharge capacity of the vehicle display module is low, which affects the use experience. In this embodiment, the display module includes a first conductive adhesive 30 located in the first connecting subarea 310 and connecting the first connecting part 214 with the first support plate 121, and a second conductive adhesive 40 located in the second connecting subarea 320 and connecting the second connecting part 221 with the second support plate 122, and the first substrate 21 further includes a first electrostatic discharge terminal 2120 located in the first connecting subarea 310. The second substrate 22 includes a second electrostatic discharge terminal 2200 located in the second connecting subarea 320, and the first conductive adhesive 30 is electrically connected the first support plate 121 with the first electrostatic discharge terminal 2120, the second conductive adhesive 40 electrically connected the second support plate 122 with the second electrostatic discharge terminal 2200, and electrically connected the first support plate 121 with the first electrostatic discharge terminal 2120 through the first conductive adhesive 30, so as to facilitate the electrostatic discharge on the first substrate 21 to the metal back frame 10, the second support plate 122 and the second electrostatic discharge terminal 2200 are electrically connected through the second conductive adhesive 40, so as to facilitate the electrostatic discharge on the second substrate 22 to the metal back frame, and improve the electrostatic discharge capacity of the display module. Specifically, the first conductive adhesive 30 and the second conductive adhesive 40 may be conductive foam tape or optical adhesive embedded with conductive golden balls.

It should be noted that the orthograph projection of the second conductive adhesive 40 on the first substrate 21 can overlaps the orthograph projection of the second electrostatic discharge terminal 2200 on the first substrate 21, and the second electrostatic discharge terminal 2200 can be electrically connected to the metal layer in the second substrate 22, the specific connection structure is not limited here.

The embodiment of the application further provides a display device, which includes the display module and the device body as in the previous embodiment, and the display module and the device main body are combined into one body.

The present application reduces the complexity of the overall structure of the display module by setting the first substrate 21 of the display panel 20 on the metal back frame and setting the second substrate 22 of the display panel 20 opposite to the first substrate 21 and located between the first substrate 21 and the metal back frame 10. Obviously, this structure of directly setting the first substrate 21 of the display panel 20 on the metal back frame 10, the original film layers such as adhesive 8 and fixed cover plate 3 are omitted, and the thickness of the display module is reduced to meet the thinning requirements of the display module.

To sum up, although the invention has been disclosed as above in the preferred embodiment, the above preferred embodiment is not intended to limit the invention, ordinary technicians in the art can make various changes and refinements without departing from the spirit and scope of the invention, therefore, the protection scope of the invention shall be subject to the scope defined in the claims.

What is claimed is:

1. A display module comprising a metal back frame and a display panel disposed on the metal back frame, wherein the display panel comprises:
   a first substrate, wherein at least one end of the first substrate is disposed on the metal back frame; and
   a second substrate disposed opposite to the first substrate and located between the first substrate and the metal back frame, wherein a liquid crystal layer is disposed between the first substrate and the second substrate; and
   wherein the first substrate comprises a base and a thin film transistor layer disposed on one side of the base close to the second substrate;
   the display panel further comprises an opposing area and a connecting area surrounding the opposing area;
   the first substrate further comprises a display driving part located in the opposing area and a first connecting part located in the connecting area; and
   the metal back frame comprises a metal back cover disposed opposite to the first substrate and a metal support plate extending along a direction from the peripheral side of the metal back cover to the first substrate, and the metal support plate is located in the connecting area and connected to the first connecting part;
   wherein the display module further comprises a first conductive adhesive located in the connecting area and connecting the first substrate with the metal back frame; and
   the thin film transistor layer comprises a first electrostatic discharge terminal located in the connecting area, and the first conductive adhesive is electrically connecting the metal support plate with the first electrostatic discharge terminal;
   wherein the thin film transistor layer is provided with a first groove located in the connecting area, and the first electrostatic discharge terminal is disposed in the first groove; and
   one end of the first conductive adhesive is electrically connected to the metal support plate, and another end of the first conductive adhesive is disposed in the first groove and is electrically connected to the first electrostatic discharge terminal.

2. The display module according to claim 1, wherein the thin film transistor layer further comprises a first metal layer disposed on the base, a second metal layer disposed on the first metal layer, and an insulating layer stacked with the first metal layer and the second metal layer, and the first groove is defined in the insulating layer and located in the connecting area; and the first metal layer comprises the first electrostatic discharge terminal, or the second metal layer comprises the first electrostatic discharge terminal.

3. The display module according to claim 2, wherein the second metal layer comprises the first electrostatic discharge terminal, and the insulating layer comprises a first insulating sublayer disposed on a side of the second metal layer away from the base; and the first groove corresponds to the first electrostatic discharge terminal and is defined in the first insulating sublayer.

4. The display module according to claim 2, wherein the first metal layer comprises the first electrostatic discharge terminal, and the insulating layer comprises a first insulating sublayer disposed on one side of the second metal layer away from the base, and a second insulating sublayer disposed between the first metal layer and the second metal layer; and the first groove corresponds to the first electrostatic discharge terminal and is defined in the first insulating sublayer and the second insulating sublayer.

5. The display module according to claim 1, wherein the metal supporting plate is provided with a second groove located in the connecting area; and one end of the first conductive adhesive is disposed in the second groove and is electrically connected to the metal supporting plate, and another end of the first conductive adhesive is disposed in the first groove and is electrically connected to the first electrostatic discharge terminal.

6. The display module according to claim 5, wherein the second groove is annularly defined in the metal supporting plate and disposed around the opposing area.

7. The display module according to claim 1, wherein an orthograph projection of the first conductive adhesive on the base overlaps an orthograph projection of the first electrostatic discharge terminal on the base.

8. The display module according to claim 1, wherein the first connecting part is disposed around the display driving part and connected to the metal supporting plate, and the second substrate is disposed opposite to the display driving part and is located in the opposing area.

9. The display module according to claim 1, wherein the connecting area comprises a first connecting subarea and a second connecting subarea, the metal support plate comprises a first support plate located in the first connecting subarea and a second support plate located in the second connecting subarea, and a distance from the second support plate to the first substrate is greater than a distance from the first support plate to the first substrate; and the second substrate comprises a second connecting part located in the second connecting subarea, the first support plate and the first connecting part are connected in the first connecting subarea, and the second support part and the second connecting part are connected in the second connecting subarea.

10. The display module according to claim 9, wherein the display module further comprises the first conductive adhesive located in the first connecting subarea and connecting the first connecting part with the first support plate, and a second conductive adhesive located in the second connecting subarea and connecting the second connecting part with the second supporting plate; and the first substrate further comprises the first electrostatic discharge terminal located in the first connecting subarea, the second substrate further comprises a second electrostatic discharge terminal located in the second connecting subarea, the first conductive adhesive is electrically connected the first support plate with the first electrostatic discharge terminal, and the second conductive adhesive is electrically connected the second support plate with the second electrostatic discharge terminal.

11. A display device comprising a display module and a device main body, wherein the display module and the device main body are combined into one body;

wherein the display module comprises a metal back frame and a display panel disposed on the metal back frame, and the display panel comprises:

a first substrate, at least one end of the first substrate is disposed on the metal back frame; and a second substrate disposed opposite to the first substrate and is located between the first substrate and the metal back frame, a liquid crystal layer is disposed between the first substrate and the second substrate; and wherein the first substrate comprises a base and a thin film transistor layer disposed on one side of the base close to the second substrate;

wherein the display panel further comprises an opposing area and a connecting area surrounding the opposing area;

the first substrate further comprises a display driving part located in the opposing area and a first connecting part located in the connecting area; and the metal back frame comprises a metal back cover disposed opposite to the first substrate and a metal support plate extending along a direction from the peripheral side of the metal back cover to the first substrate, and the metal support plate is located in the connecting area and connected to the first connecting part;

wherein the display module further comprises a first conductive adhesive located in the connecting area and connecting the first substrate with the metal back frame; and the thin film transistor layer comprises a first electrostatic discharge terminal located in the connecting area, and the first conductive adhesive is electrically connected the metal support plate with the first electrostatic discharge terminal;

wherein the thin film transistor layer is provided with a first groove located in the connecting area, and the first electrostatic discharge terminal is disposed in the first groove; and one end of the first conductive adhesive is electrically connected to the metal support plate, and another end of the first conductive adhesive is disposed in the first groove and is electrically connected to the first electrostatic discharge terminal.

12. The display device according to claim 11, wherein the thin film transistor layer further comprises a first metal layer disposed on the base, a second metal layer disposed on the first metal layer, and an insulating layer stacked with the first metal layer and the second metal layer, and the first groove is defined in the insulating layer and located in the connecting area; and the first metal layer comprises the first electrostatic discharge terminal, or the second metal layer comprises the first electrostatic discharge terminal.

13. The display device according to claim 11, wherein the connecting area comprises a first connecting subarea and a second connecting subarea, the metal support plate comprises a first support plate located in the first connecting subarea and a second support plate located in the second connecting subarea, and a distance from the second support plate to the first substrate is greater than a distance from the first support plate to the first substrate; and the second substrate comprises a second connecting part located in the second connecting subarea, the first support plate and the first connecting part are connected in the first connecting subarea, and the second support plate and the second connecting part are connected in the second connecting subarea.

14. The display device according to claim 13, wherein the display module further comprises the first conductive adhesive located in the first connecting subarea and connecting the first connecting part with the first support plate, and a second conductive adhesive located in the second connecting subarea and connecting the second connecting part with the second supporting plate; and the first substrate further comprises the first electrostatic discharge terminal located in the first connecting subarea, the second substrate further comprises a second electrostatic discharge terminal located in the second connecting subarea, the first conductive adhesive is electrically connected the first support plate with the first electrostatic discharge terminal, and the second conductive adhesive is electrically connected the second support plate with the second electrostatic discharge terminal.

* * * * *